UNITED STATES PATENT OFFICE.

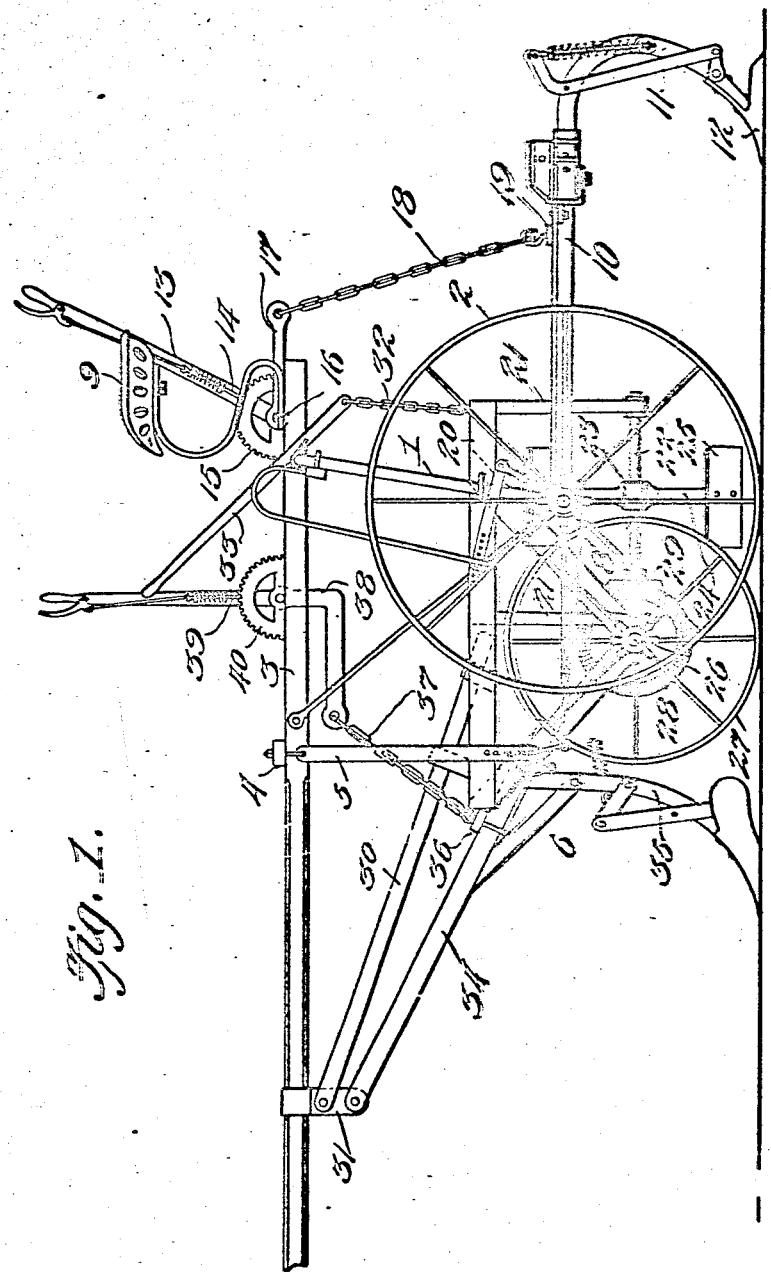

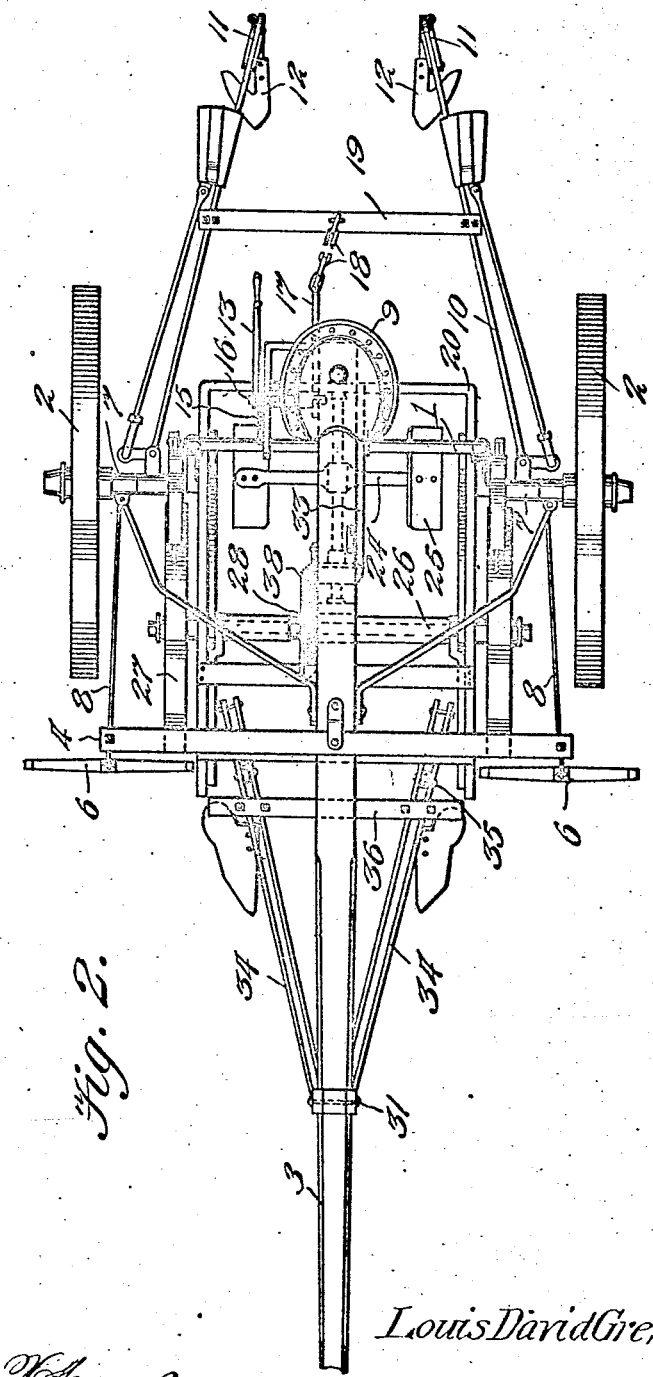

LOUIS DAVID GRESHAM, OF ALBA, TEXAS.

COTTON-CHOPPER.

No. 895,259.  Specification of Letters Patent.  Patented Aug. 4, 1908.

Application filed August 27, 1907. Serial No. 390,352.

*To all whom it may concern:*

Be it known that I, LOUIS DAVID GRESHAM, a citizen of the United States, residing at Alba, in the county of Wood and State of Texas, have invented new and useful Improvements in Cotton-Choppers, of which the following is a specification.

This invention relates to that class of devices which are known as cotton choppers and which are used for removing surplus plants from a row of growing plants, leaving stands at suitable intervals for subsequent cultivation and growth.

The present invention has particular reference to an improved cotton chopping device or attachment adapted to be used in connection with an ordinary cultivator, the frame of which constitutes the carrying frame of a machine.

The invention has for its objects to simplify and improve the construction and operation of the chopping device and related parts.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawings, Figure 1 is a side elevation of a machine embodying the invention. Fig. 2 is a top plan view of the same.

Corresponding parts in both figures are denoted by like characters of reference.

The axle arch 1 of the cultivator which constitutes the carrying frame of the device, is supported upon the transporting wheels 2—2, and it is provided with the tongue or longitudinal frame bar 3 carrying the double tree 4 having depending links 5 for the attachment of the whiffletrees 6; said links being connected in the usual manner with the stub axles 7 by means of links or connecting rods 8. The tongue 3 supports a spring seat 9 for the driver or operator. The cultivator beams 10 are connected in the customary manner with the stub axles, and said beams are provided with the standards 11 carrying the blades 12; said blades being preferably mounted upon the standards in such a manner as to yield to stones, stumps and other obstructions that may be encountered, springs being provided to restore the blades to normal operative position. This construction has been conventionally illustrated in the drawings, but is not regarded as a part of the present invention.

Vertical adjustment of the cultivator beams may be effected by means of a lever 13 having a spring actuated stop member 14 engaging a segment rack 15; said lever being connected with a rock shaft 16 having a crank 17 which is connected by a flexible member such as a chain 18 with a cross-bar 19 connecting the cultivator beams.

The chopper frame 20 is provided with depending brackets 21 affording bearings for a longitudinal shaft 22 carrying a hub 23 provided with radial arms 24 upon which the chopper blades or hoes 25 are suitably secured. The chopper frame is also provided with bearings for a transverse shaft or axle 26 having transporting traction wheels 27 and carrying a bevel gear 28 meshing with a bevel pinion 29 upon the longitudinal shaft 22 to which motion will thus be transmitted. The chopper frame is connected by means of a draft bar 30 with a bracket 31 depending from the tongue 3 of the cultivator; the chopper frame is also connected by means of a chain 32 with one end of a lever 33 which is fulcrumed in a convenient position to be operated or actuated by the foot of the driver occupying the seat 9 and who, by placing his foot upon the lever 33, may tilt said lever, thus elevating the chopper frame to an inoperative position above the ground. The lever 33 is provided with a fulcrum piece, preferably in the form of a hook adapted for detachable connection with a part of the cultivator such as the arched axle as shown in Fig. 1 whereby said lever may be easily clipped on the axle and removed therefrom.

Hingedly connected with the depending bracket 31 are rearward extending plow beams 34 having plow carrying standards 35, the blades of which are used for barring off the row of plants that is to be operated upon. The beams 34 are connected with each other by means of a cross-bar 36, whereby the rear ends of said beams are suitably spaced apart; and said cross-bar is connected by suitable means such as a chain 37 with an operating lever 38 having a spring actuated stop member 39 engaging a segment rack 40 whereby the barring plows may be suitably adjusted and retained in adjusted position.

From the foregoing description taken in connection with the drawings hereto annexed, the operation and advantages of this invention will be readily understood by those skilled in the art to which it appertains.

The chopper frame and the barring plows may be readily applied to any cultivator of ordinary construction, and the expense of a separate carrying frame for these implements will thus be avoided.

It will be evident that the barring plows may be used in connection with the cultivator frame without the chopper. After the plants have attained a stage of growth which renders it desirable that they should be thinned, or chopped out, the chopper frame is connected with the cultivator frame in the manner described, and the row of plants is operated upon by the machine which straddles the row. The plants will be subjected to the action of the revolving chopper, the blades of which will chop out the superfluous plants, leaving stands of the desired dimensions, which may obviously be regulated by using chopping blades of any desired length; it being evident that by reducing the length of the chopping blades, the dimensions of the stands will be increased, and vice versa. For this reason, it will be found desirable to mount the chopping blades 25 upon the arms 24 in such a manner as to be readily detachable, and to provide each machine with an equipment of several sets of chopping blades or hoes of different dimensions. The plants, having been thinned by the action of the chopper, will be bedded by the action of the cultivator shovels which will be arranged to throw the loose dirt in the direction of the growing plants, the roots of which will thus be thoroughly protected, thus promoting the safe and vigorous growth of the plants.

Having thus fully described the invention, what is claimed as new is:—

A cotton chopper attachment for a cultivator, comprising a main frame, a draft beam rigidly attached to said frame, extending upward therefrom and adapted to be pivotally connected to the cultivator at its forward end, a wheel carrying axle journaled transversely in the chopper frame, traction wheels thereon, a chopper carrying shaft supported for rotation longitudinally in the frame and geared to said axle, and a lever for effecting up and down adjustment of the chopper frame on the pivotal point of the draft beam, said lever having a fulcrum piece adapted for detachable connection with a part of the cultivator.

In testimony whereof I affix my signature in presence of two witnesses.

LOUIS DAVID GRESHAM.

Witnesses:
J. O. WILLIAMS,
T. S. RUBBOURG.